United States Patent [19]

Fortin

[11] Patent Number: 5,265,325
[45] Date of Patent: Nov. 30, 1993

[54] TOOLING FOR ASSEMBLY OF COMPACT DISK DRIVE

[75] Inventor: James L. Fortin, Saratoga, Calif.
[73] Assignee: Areal Technology, San Jose, Calif.
[21] Appl. No.: 780,006
[22] Filed: Oct. 21, 1991
[51] Int. Cl.⁵ .............................................. G11B 5/42
[52] U.S. Cl. ........................................ 29/742; 29/603; 29/761
[58] Field of Search ............... 29/603, 737, 742, 729, 29/761

[56] References Cited

U.S. PATENT DOCUMENTS 5,142,770  9/1992  Cain et al. .................. 29/603 X Primary Examiner—Carl E. Hall
Attorney, Agent, or Firm—Nathan N. Kallman

[57] ABSTRACT

Tooling for assembling a compact disk drive useful for laptop computers includes a ball swaging fixture for joining head flexures to a head arm/actuator subassembly; and a motor/disk platform and disk clamping means for joining a drive motor to magnetic disks. The ball swaging fixture comprises a ball staking fixture for securing the flexures to the head arm/actuator subassembly. The disk clamping means includes a torque gage for assembling a clamp to the drive motor and motor hub. The tooling allows assembly of a compact disk drive at a single station by a single operator.

20 Claims, 12 Drawing Sheets

TOOLING FOR ASSEMBLY OF COMPACT DISK DRIVE

FIELD OF THE INVENTION

This invention relates to a method and means of assembling a compact disk drive useful for laptop computers.

BACKGROUND OF THE INVENTION

A typical disk drive for storing data generally includes one or more magnetic disks, a drive motor and motor hub on which the disks are seated, a number of magnetic heads and a head actuator for moving the heads radially relative to the recording surfaces of the disks.

The conventional method of assembling a disk drive generally employs a production line having a multiplicity of successive stations. The disk drive is assembled part by part at each station where an operator performs a specified step of the assembly process. This method of assembly is time-consuming, labor-intensive and subject to operator error. Also, the use of multiple stations requires a large amount of space, and several expensive tools and equipment are needed for the assembly of the disk drives.

Presently disk drive technology is directed to making compact and lightweight units that can be incorporated into portable data processors, such as notebook and laptop computers. It would be highly desirable to minimize the space and time required to assemble a compact disk drive. It would also be desirable to reduce and eliminate the fixtures and equipment conventionally needed for the assembly of compact disk drives.

SUMMARY OF THE INVENTION

An object of this invention is to provide an improved method and means for assembling a compact disk drive using compact tooling and fixtures in a limited space.

Another object of this invention is to provide a method and means of assembling a compact disk drive at a single assembly station by one or more operators.

According to this invention, tooling for assembling a compact disk drive comprises a ball swaging fixture for joining magnetic head flexures, which support magnetic head sliders and transducers, to a head arm/actuator subassembly and for attaching head circuit wires to a flexible circuit cable for connection to external circuitry; and a motor/disk platform and clamping device for joining the disk drive motor and drive motor hub to the storage disks. The disk clamping device includes a torque gage for controllably assembling a clamp to the drive motor hub. In the final assembly, the head arm/actuator subassembly, including the actuator magnet and housing, are positioned and joined to the motor/disk subassembly to provide a completely operable compact disk drive. The entire assembly is achieved at a single position or station and by a single operator, which may be a human operator or automated robotic operator.

BRIEF DESCRIPTION OF THE DRAWING

The invention be described in detail with reference to the drawing in which.

Figure 13:
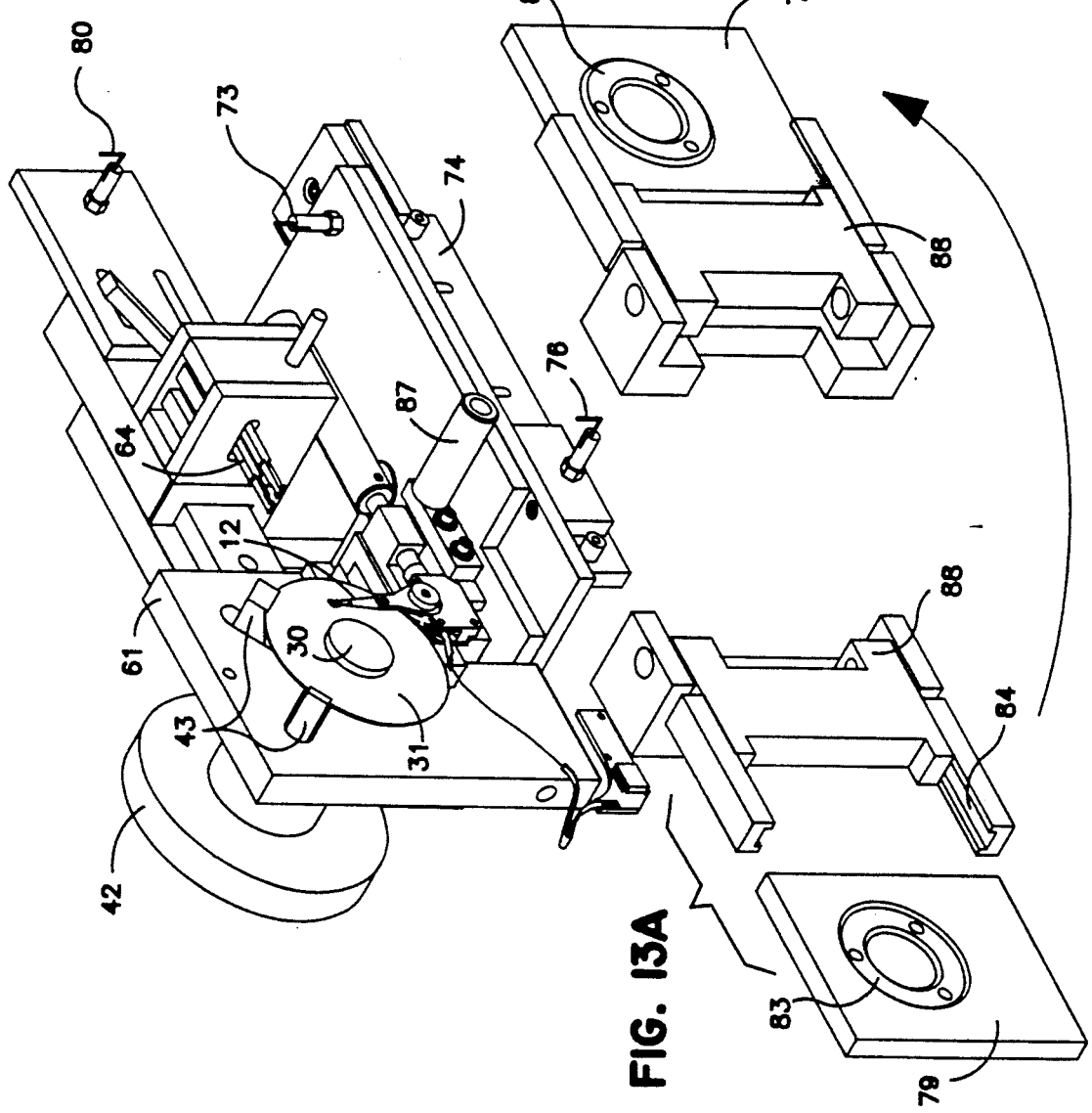
FIG. 13A is an exploded view showing a baseplate and baseplate holder used for engaging the disk motor assembly.

7 FIG. 13B an isometric view of the assembled components of FIG. 13A, showing the baseplate seated in the holder.

Figure 14:
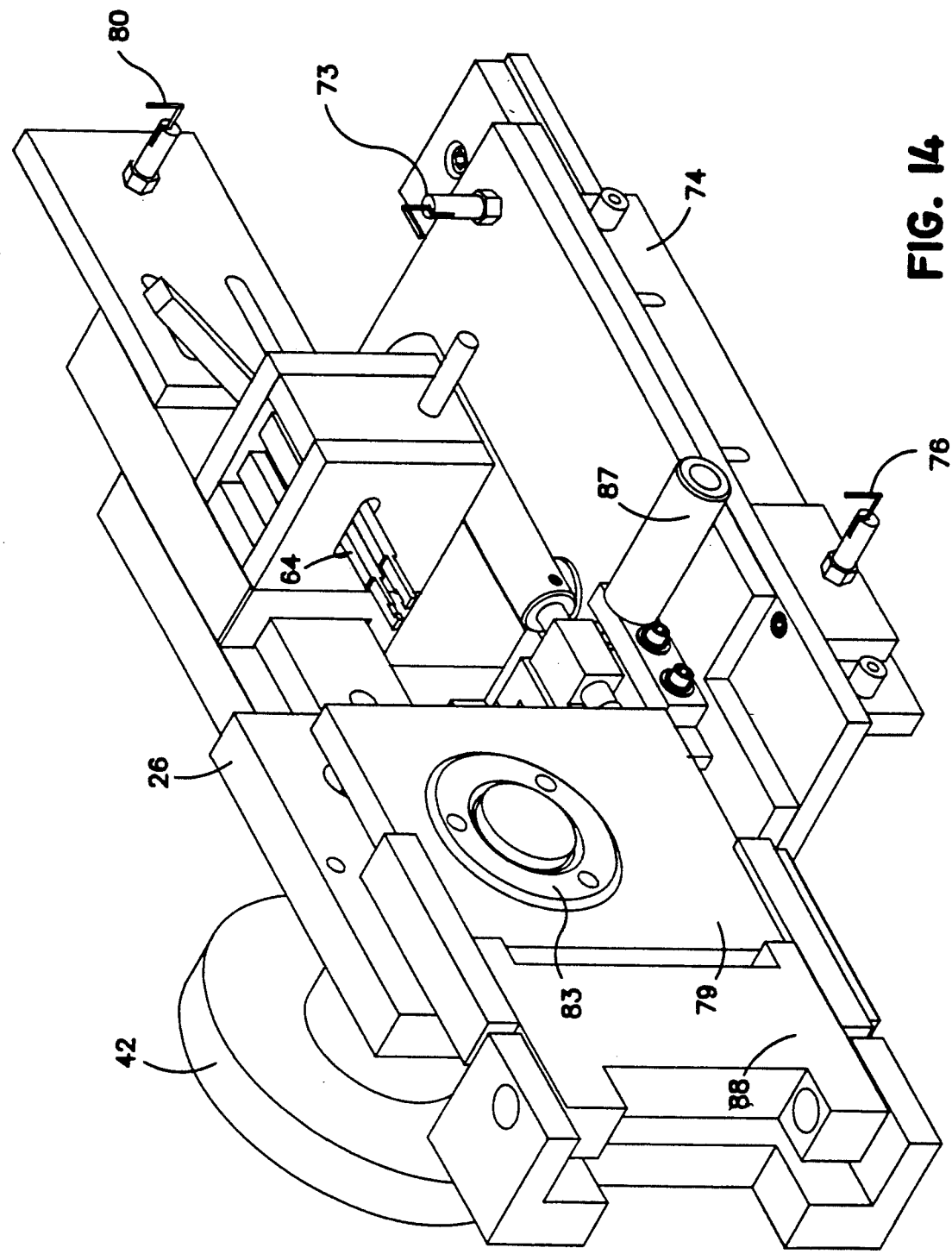

FIG. 13C is an isometric view showing the head loader in a retracted position and the disk motor and actuator assemblies ready for installation of the baseplate; and FIG. 14 is an isometric view showing the baseplate in position over the disk motor and actuator. Similar numerals refer to similar elements in the drawing.

DETAILED DESCRIPTION OF THE PREFERRED EMBODIMENT

Figure 1:
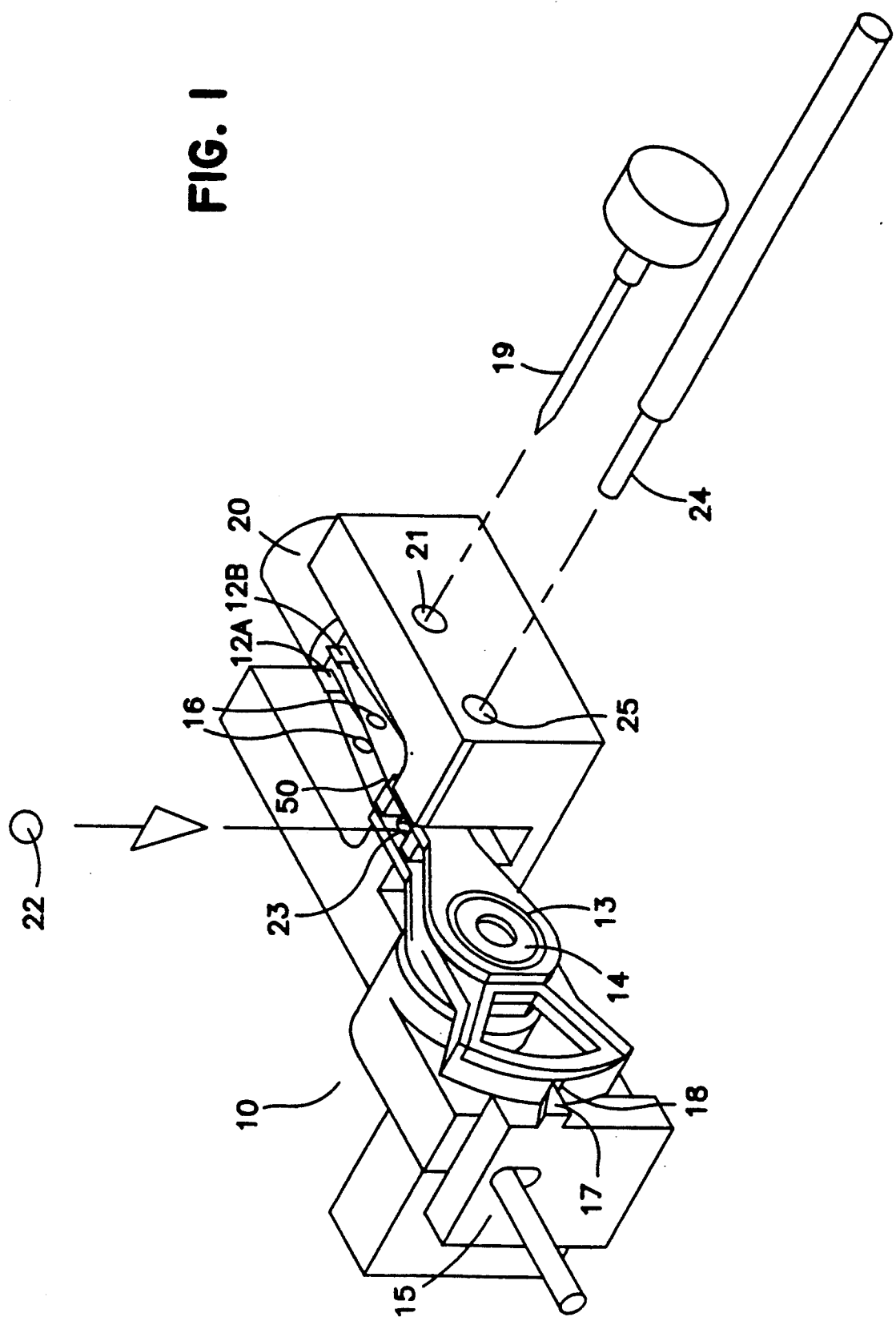
FIG. 1 is an isometric view of a ball swaging fixture, for assembling head arms and flexures to a head actuator.

FIG. 1 illustrates a holding and ball swaging fixture 10 which is used to install head flexures 12a and 12b to a head arm actuator subassembly 13. During installation, the head arm/ subassembly 13 which includes a bearing cartridge 14 is mounted to the ball swaging fixture 10 by locating the bearing cartridge 14 in a bearing hole of the fixture 10. A spring locator 15 is pushed forward and the head arm/actuator subassembly 13 is then rotated clockwise to the position shown in FIG. 1. The spring locator 15 is released to allow a locating wedge 17 to engage a slot 18 formed with the head arm/actuator subassembly 13. The head flexures 12a and 12b are installed as shown in FIG. 1.

Figure 8:
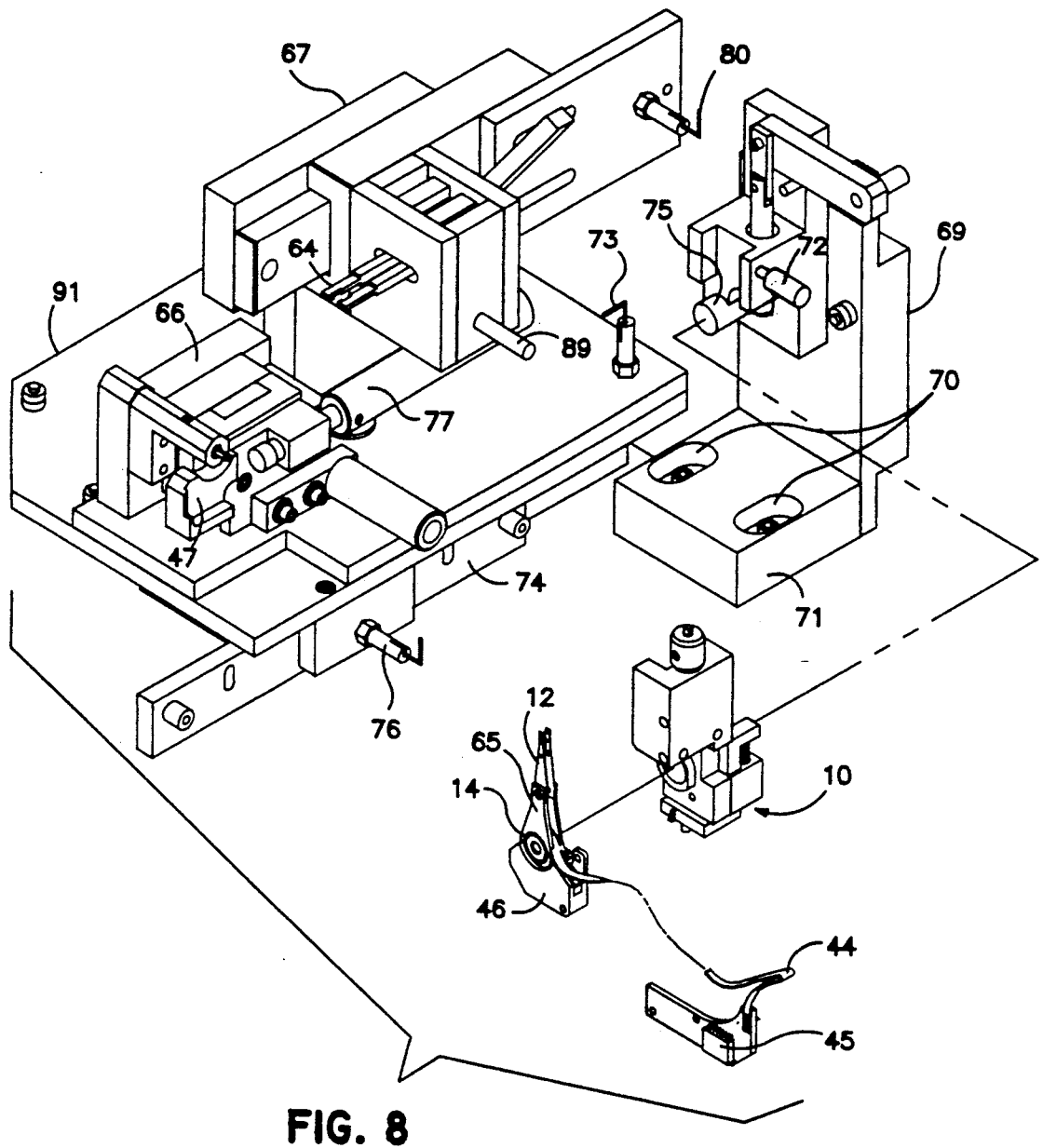
FIG. 8 is an isometric view, partly exploded, showing a head loader, swaging tool and swaging tool pivot assembly used for assembling the head arm, flexible circuit and the magnet housing of the head actuator.

An alignment pin 19 is then inserted through a hole 21 in the side of ball staking fixture 10 and into the flexure guide holes 16. A knob 20 is moved inwardly to secure the flexures 12 against the head arm/actuator subassembly 13 by means of a sliding spacer. With the flexures 12 secured in position, a swaging ball 22 is dropped into a sliding spacer slot or ball catcher 23. A ball drive punch 24 is inserted through a hole 25 in the side of the fixture 10. While the head arm/actuator 13 is securely held against the fixture 10, the drive punch 24 is pressed against the ball 22 through a hole 65 (see FIG. 8) in the head arm 13. The ball 22 is pushed through a flexure boss to expand the diameter of the flexure 12a resulting in the joinder of the flexure 12a to the head arm/actuator subassembly 13. The drive punch 24 is removed from the fixture 10 which is then flipped to be upright. The drive punch 24 is positioned at the opposing side of the fixture and another swaging ball 22 is dropped into the ball catcher 23. The swaging fixture 10 is then flipped 90° degrees onto its side so that the ball drive punch 24 can be pushed to press the swaging ball through a boss in the flexure 12b from the other side of the fixture to join flexure 12b to the head arm/actuator subassembly 13. The drive punch 24 and the alignment pin 19 are then removed from the swaging fixture 10.

Figure 2:
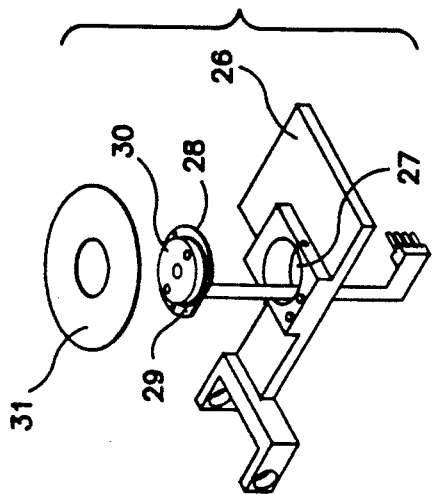
FIG. 2 is an exploded view illustrating a motor disk platform for assembling a storage disk, disk drive motor and disk clamp ring.
Figure 3:
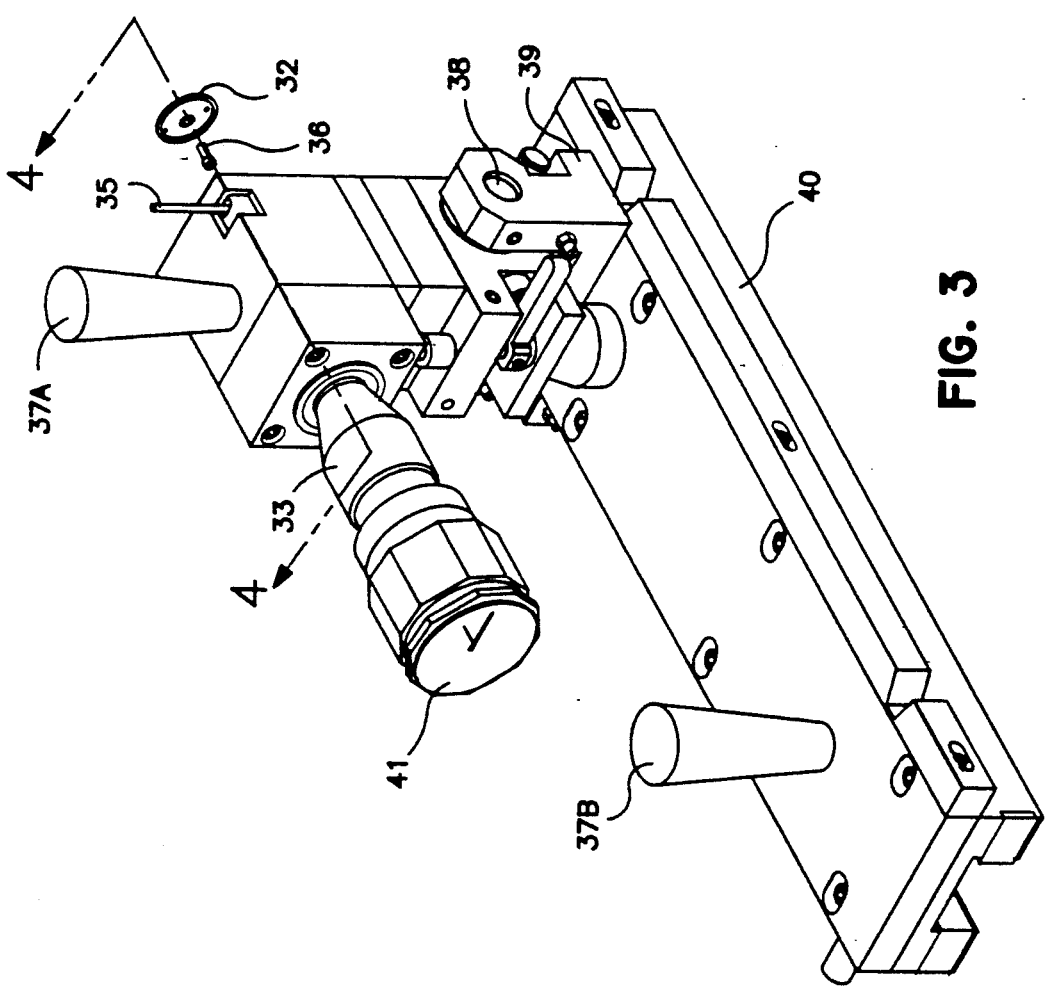
FIG. 3 is an isometric view of a torque gage fixture used for screwing the disk, disk motor and disk clamp together.

FIGS. 2 and 3 illustrate the parts used for the motor/disk subassembly 50. A motor/disk platform 26 is formed with a cylindrical aperture 27 to accommodate a fixed flange 28 that supports a disk drive motor 29. During operation of the disk drive, the flange 28 remains stationary while the drive motor 29 is rotated. A motor hub 30 is joined to the motor 29 and to the flange 28 and has a step for accepting a clamp 32 used to seat a magnetic disk 31. To assemble the disk 31 with the motor 29 and hub 30, the disk clamp 32 and screw 36 are installed in a torque gage tool 33, which houses a three-finger disk clamp chuck 34, shown in detail in FIG. 4. By moving a lever 35 outwardly, the clamp chuck 34 is opened to allow placement of the disk clamp 32 and a T-6 screw 36 into the chucking device of the torque gage tool 33. The disk clamp 32 and screw 36 are secured in a fixed position in the torque gage 33 by moving the lever 35 inwardly.

Figure 4:
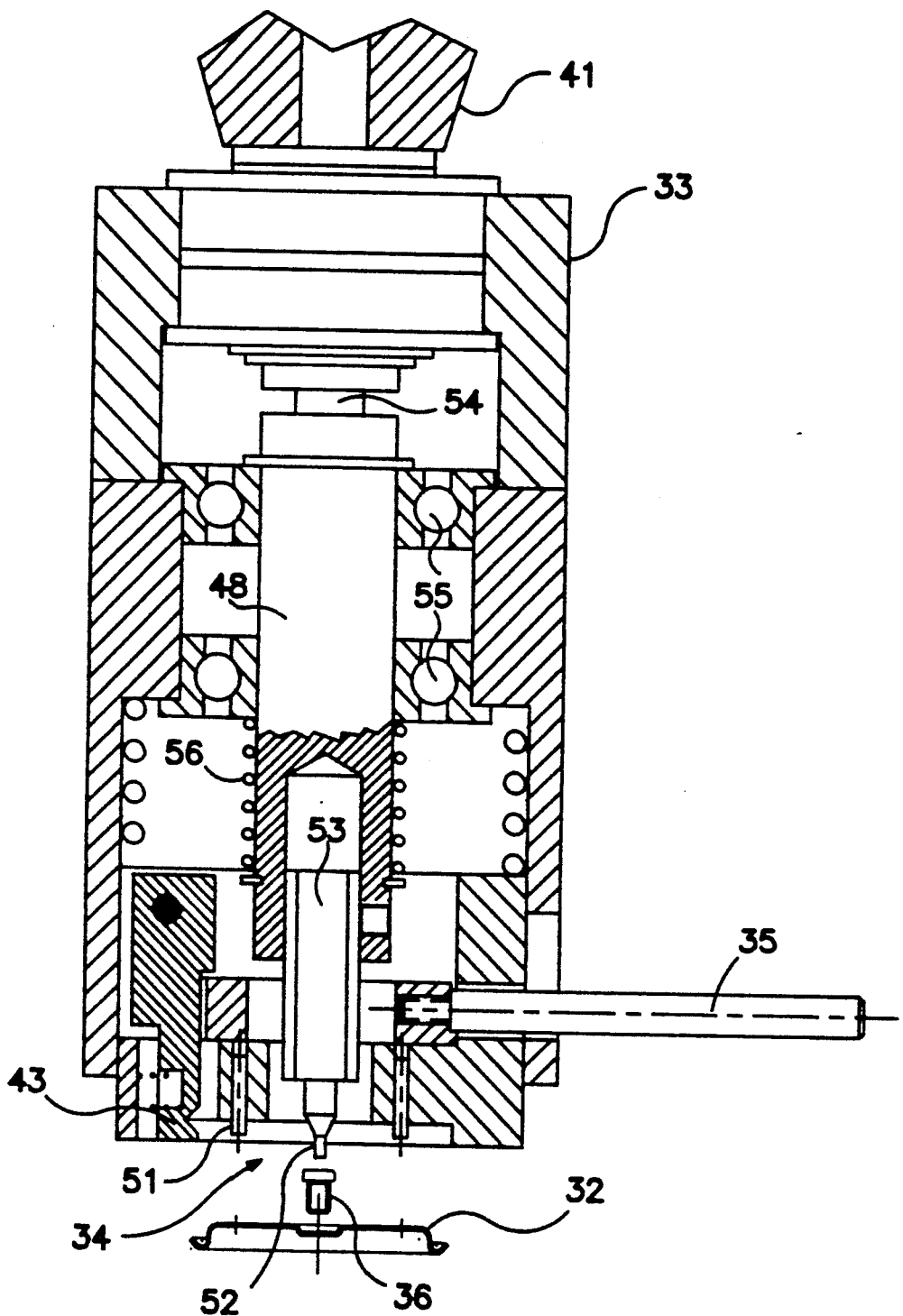
FIG. 4 is a schematic sectional view of the disk clamp installation, taken across line A—A of FIG. 3.

The disk clamp chuck 34, shown in FIG. 4, has extending pins 51 and fingers 43 for holding the disk clamp 32. With the disk clamp in place, the screw 36 is engaged by the tip 52 of a screwdriver 53 that is centrally located within the chucking device. A slip joint 54 allows the screwdriver shaft to float up and down while the driver is rotated. A compression spring 56 urges the tip 52 of the driver 53 into the slot of the head of the screw 36. Ball bearings 55 are provided around the driver shaft to enable easy rotation of the driver.

Figure 5:
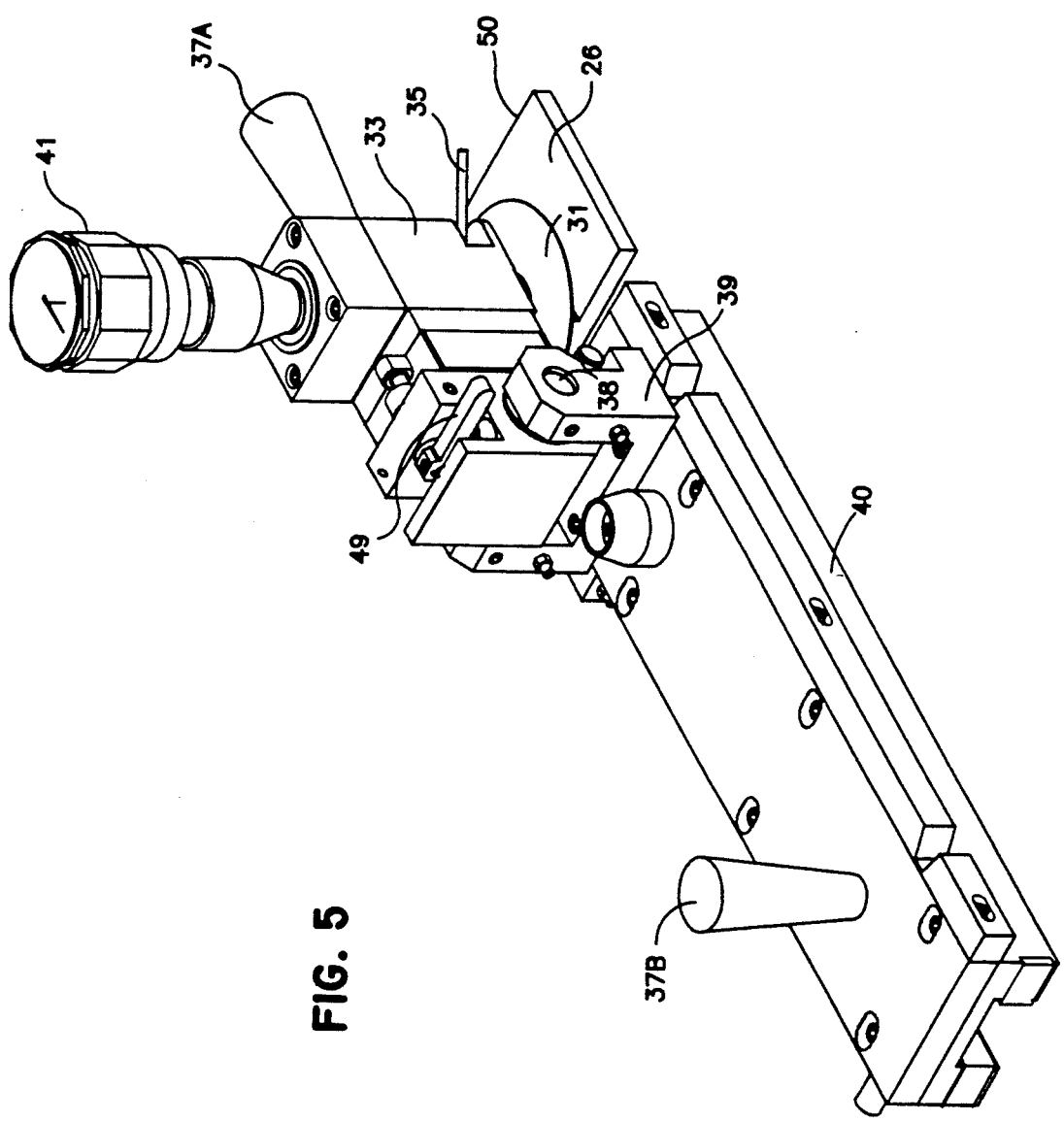
FIG. 5 is an isometric view of the torque gage of FIG. 3 rotated 90°.

As illustrated in FIG. 5, the torque gage 33 with the clamp 32
and screw 36 secured in position is rotated 90° downwards.

The torque gage 33 is slid to be located directly over the motor/disk subassembly 50. A lever 49 is moved to actuate the torque gage 33 downwards towards the motor/disk subassembly 50 disposed on the platform 26 shown in FIG. 2. By rotating the torque gage knob 41, the driver 53 is rotated and the screw 36 which is engaged by the driver tip 52 is turned to tighten the clamp 32 to the hub 30. The motor clamping screw 36 is torqued to about 10 inch-ounce pressure which is maintained for about five seconds. The disk clamp chuck 34 is then opened by means of the lever 35 and the torque gage 33 is retracted by moving lever 49 back and sliding the torque gage 33 away from the motor platform 26 by means of a handle 37B.

Figure 7:
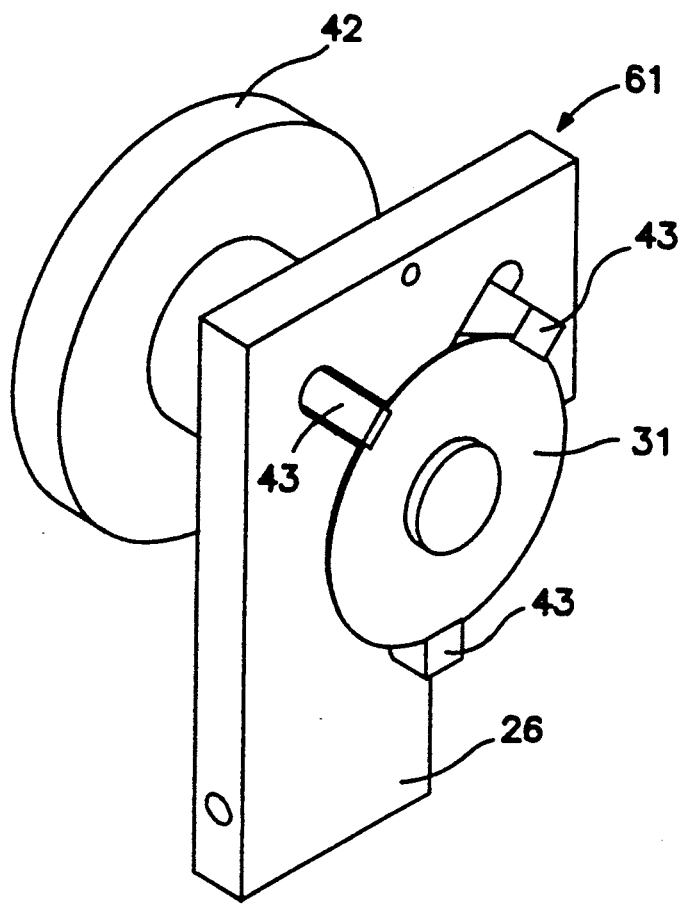
FIG. 7 shows motor and disk of FIG. 6 rotated and held in a vertical position.
Figure 6:
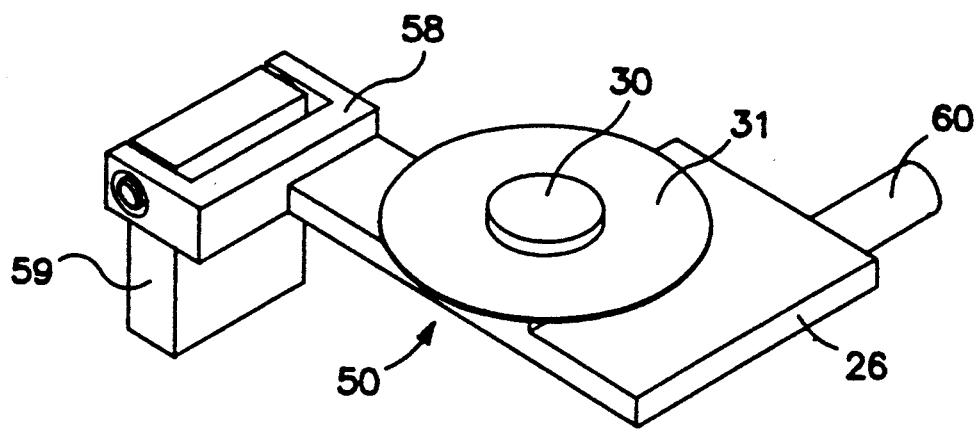
FIG. 6 is a isometric view of a motor and disk assembly platform.

The motor/disk subassembly 50 and its platform 26 are rotated about a base 59 of a predetermined height, as shown in FIG. 6. Using a handle 60, the motor/disk subassembly 50 is rotated to a vertical position in alignment with a holding fixture 61 shown in FIG. 7. A large knob 42 in the holding fixture 61 controls the opening and closing of three holding fingers 43. When the knob 42 is turned 60°, the fingers 43 retract to allow the disk 31 and its clamped assembly 50 to be located between the fingers. The knob 42 is turned another 60° to close the fingers around the disk and to securely hold the motor/disk assembly in place. The platform 26 is rotated to a horizontal position. The holding fixture 61 with the motor/disk assembly 50 are set aside while the head arm and actuator assembly 13 is prepared for loading the heads to the disk surfaces.

In accordance with this invention, an actuator installation mechanism 66, such as shown in FIGS. 8-13, is used for installing the magnetic heads to the storage disks. The actuator installation mechanism 66 includes a head loader subassembly 67, swaging tool 10 and swaging tool pivot subassembly 69. The head arm assembly 13 remained in the swaging fixture 10 after the heads 12 were swaged to the arm 13. The magnetic housing 46 is installed over the coil end of the arm 13 after retracking the spring locator 15. The locator 15 is released after the magnetic housing 46 is in place. The heads are electrically connected via a flexible circuit cable or tape 44 to pins 45 for connection to a plug and external circuitry.

Figure 9:
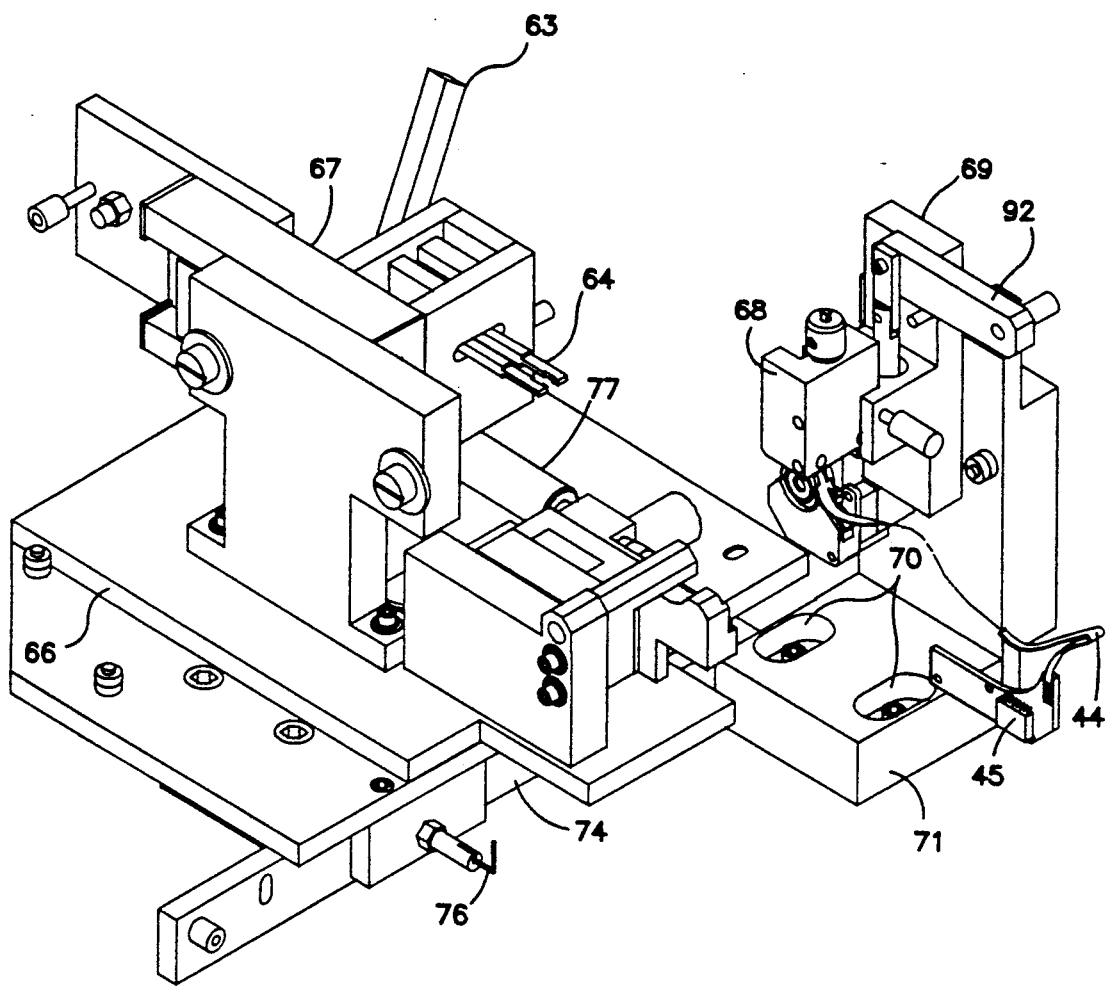
FIGS. 9, 10 and 11 isometric views of the tool assembly shown in FIG. 8, repositioned and oriented for loading the magnetic heads relative to the disk surfaces.
Figure 10:
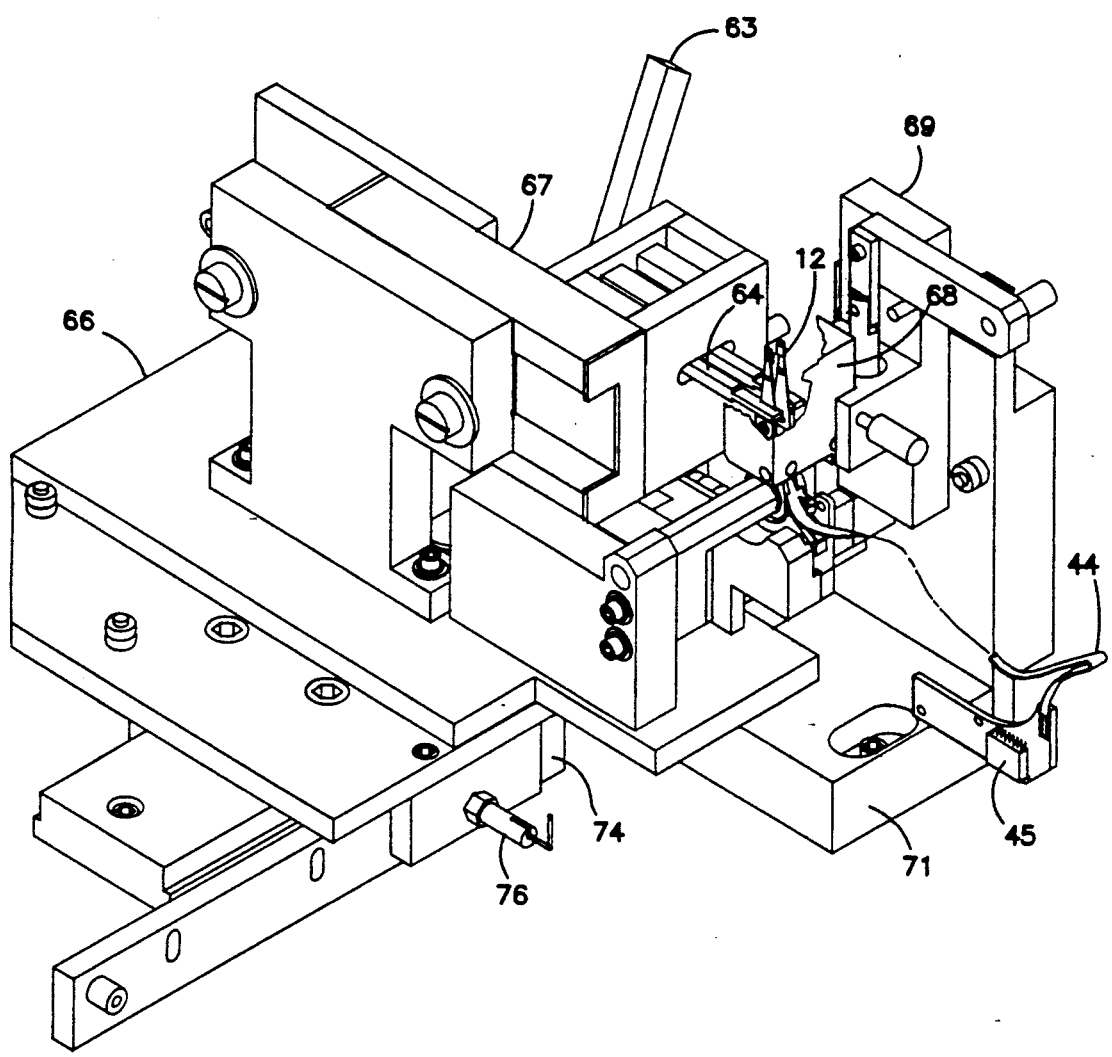

To effectuate head installation, the head arm assembly 13 and the magnet housing 46 are mounted with the swaging tool 10 on a cylindrical projection 75 formed with the swaging tool pivot subassembly 69. A pin 73 is retracted to allow the actuator installation mechanism 66 to b=rotated on a base 91 about 90° from the position shown in FIG. 8 so that the head loader is positioned relative to the swaging tool pivot subassembly 69, as shown in FIG. 9. Pin 76 is pulled out so that the actuator installation mechanism 66 is free be guided to towards the pivot subassembly 69. Pin 80 is retracted and the head loader 67 is guided backward ensuring that load fingers 64 are retracted, as shown in FIG. 9, and that the flexible circuit 44 is clear of the loader mechanism. By retracting pin 76 the actuator installation mechanism 66 is moved and located over the pivot subassembly 69, as shown in FIG. 10. The load fingers 64 are spread apart by rotating handle 63 as shown in FIG. 10, raised vertically using handle 89 and moved adjacent to the head arms and flexures 12 after retracting pin 80.

Figure 11:
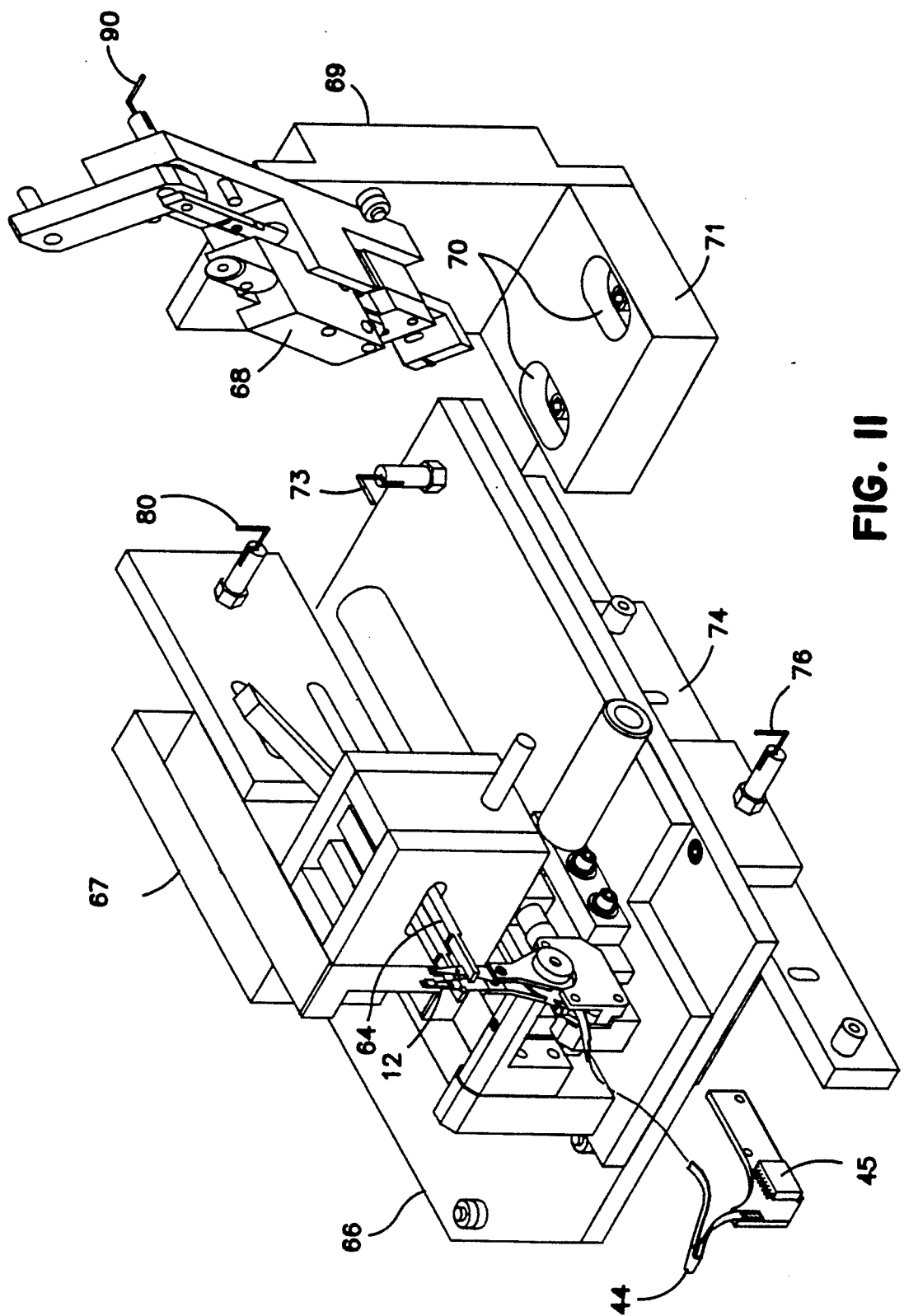

The magnet housing 46 is secured, by rotation of the knob 77, in a nesting pocket 47. The load fingers 64 are then closed by rotating handle 63 and are lowered vertically using handle 89 to engage the head flexures 12. The load fingers 64 are opened and ever 92 is rotated 180° freeing the magnet housing 46. The swaging tool pivot subassembly 69 is rotated away from the head loader, after pulling pin 90 as illustrated in FIG. 11. The retractable pin 76 is pulled and the actuator installation mechanism 66 is moved until the pin 76 can enter the center slot of locating bar 74. The actuator installation mechanism 66 is then rotated after pulling pin 73 so that the loader mechanism 67 is parallel to the motor/disk platform 26 and subassembly 50 of FIG. 7, as shown in FIG. 11.

Figure 12:
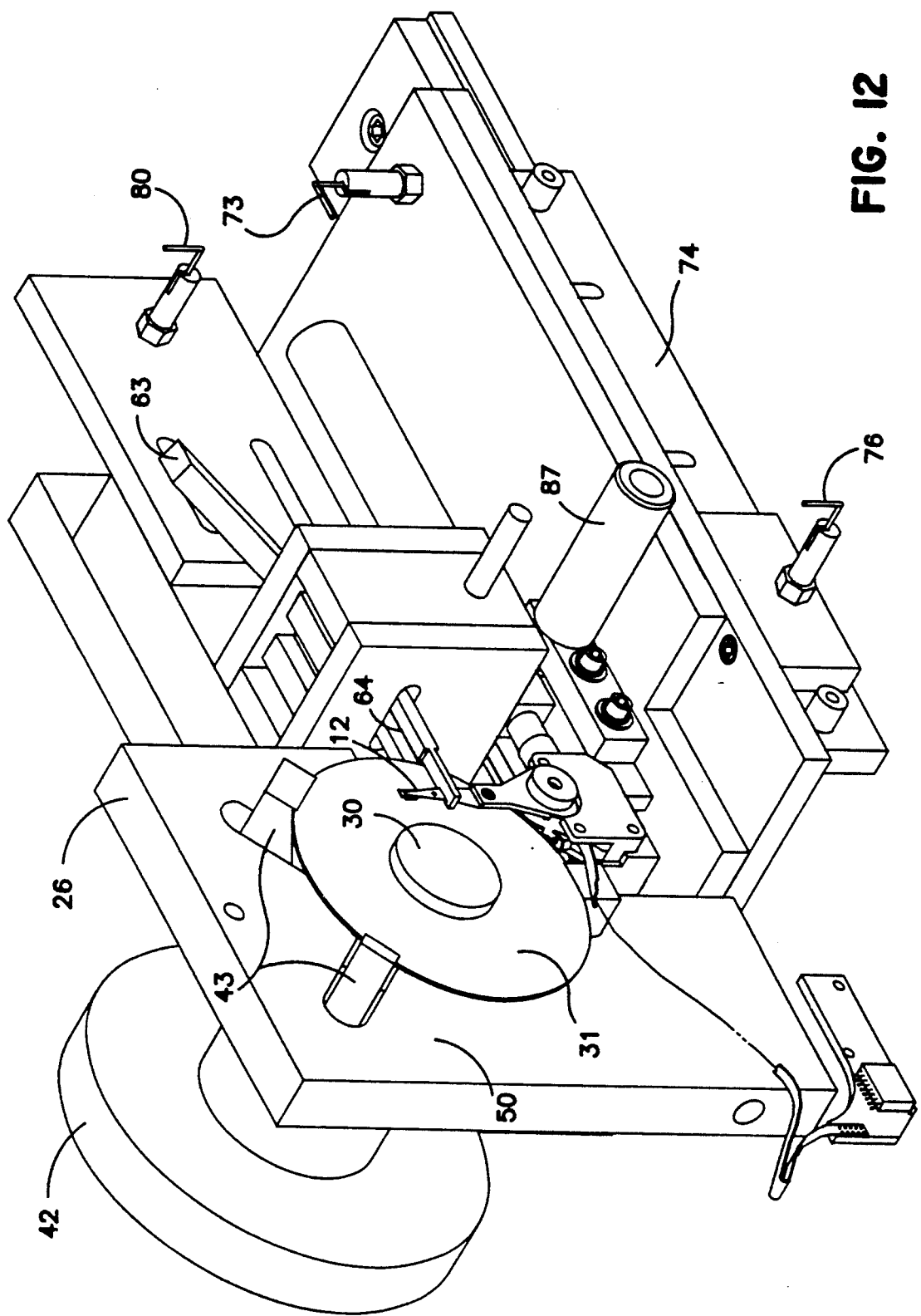
FIG. 12 is an isometric view of a head loader, showing the heads loaded to the disk surfaces.

Pin 76 is again pulled and the actuator installation mechanism 66 is moved to the left until pin 76 engages the left hand slot of locating bar 74, as shown in FIG. 12. The head load fingers 64 are then closed by rotating lever 63, thereby placing the read/write heads that are mounted at the end of the flexures 12 onto the surfaces of the disk 31. The loader mechanism 67 is rotated upwards using handle 89, the load fingers 64 are opened using lever 63 and the loader mechanism 67 is retracted after pulling pin 80.

The drive baseplate 79 is loaded into the U-shaped channels 84 of baseplate holder 88, as shown in FIG. 13A. The baseplate 79 and holder 88 are rotated 180° to the position shown in FIG. 13B, and then are pushed forward over the motor/disk subassembly 50 and the actuator subassembly 13, as shown in FIG. 14. The screws holding the motor 30 to the baseplate 79 and the actuator bearing 14 to the baseplate 79 are installed.

To allow seating of the magnet housing 46 in the baseplate 79, the spring retention knob 87 is pulled and the housing is pushed by springs into its locating corner. The knob 77, which clamps the magnet housing 46 in its nesting pocket 47, is rotated counterclockwise against its stop to release the magnet housing 46. The screws holding the magnet housing 46 to the baseplate are now installed.

The motor/disk subassembly 50 is released by turning the large knob 42 disposed at the rear of the holding fixture 61. The baseplate 79 with its attached parts is removed away from the holding fixture 61 to the position shown in FIG. 13B. The baseplate 79 is then rotated 180° to the position shown in FIG. 13A. The circuit board 45 is attached to the baseplate 79 with screws. The disk drive is removed from the baseplate holder and is now ready for further processing and assembly into a laptop computer, for example.

By virtue of the novel tooling disclosed herein, a significant savings in labor, time and equipment is realized. The use of a single station with a compact arrangement of assembly tooling at which a single operator can be employed eliminates the need for a multiplicity of fixtures and equipment requiring several locations and several operators, as typically used, and thus reduces the amount of space required for the disk drive assembly.

What is claimed is:

1. Apparatus for assembling a compact disk drive at a single assembly station, said disk drive having a head arm/actuator subassembly including magnetic head arms and an actuator for moving said arms, said head arms including head flexures that support head sliders and transducers; a motor/disk subassembly including a disk drive motor and drive motor hub and at least one storage disk mounted to said motor hub, comprising:

an actuator installation mechanism including a ball swaging tool for joining said flexures to said head arm/actuator subassembly; a head loader subassembly for loading said head flexures and head sliders to said disk; a swaging tool pivot subassembly for positioning said swaging tool and said head loader subassembly to enable loading of said head flexures and head sliders to said disk;

means for mounting said head arm/actuator subassembly to said ball swaging tool;

means for mounting said ball swaging tool with said head arm/actuator subassembly to said swaging tool pivot subassembly.

2. Apparatus as in claim 1, further including a motor/disk platform for supporting said motor/disk subassembly;

a torque gage having a disk clamp means located over said motor/disk subassembly for securing said disk;

a holding fixture aligned with said motor/disk subassembly disposed over said platform for holding said disk in a secured position for further assembly.

3. Apparatus as in claim 1, wherein said holding fixture has a knob and holding fingers, said knob controlling the closing and opening of said fingers to hold and release said disk.

4. Apparatus as in claim 1, including a magnet housing installed to said swaging tool pivot subassembly adjacent to said head arm actuator/subassembly.

5. Apparatus as in claim 1, wherein said swaging fixture comprises a ball staking fixture for assembling said flexures to said head arm/actuator subassembly.

6. Apparatus as in claim 5, wherein said ball staking fixture comprises a swaging ball, a ball catcher for receiving said ball to enable joining said flexures to said head arm/actuator subassembly.

7. Apparatus as in claim 5, including an alignment pin for insertion into said ball staking fixture and into guide holes formed in said head flexures for aligning said flexures.

8. Apparatus as in claim 1, wherein said head arm/actuator subassembly includes a bearing cartridge that is located in a bearing hole of said swaging fixture.

9. Apparatus as in claim 1, including a spring locator for engaging a wedge and a slot formed with said head arm/actuator subassembly.

10. Apparatus as in claim 1, including a movable knob and a sliding spacer for securing said flexures against said head arm/actuator subassembly.

11. Apparatus in claim 1, wherein said motor/disk platform is formed with a cylindrical aperture for supporting said disk drive motor.

12. Apparatus as in claim 1, including an actuator installation mechanism for installing said magnetic head flexures relative to said storage disk.

13. Apparatus as in claim 12, wherein said actuator installation mechanism comprises a head loader for loading said head flexures to said disk.

14. Apparatus as in claim 1, wherein said disk clamping means comprises a torque gauge, a disk clamp and a screw for assembling said clamp to said drive motor, motor hub and disk.

15. Apparatus as in claim 14, wherein said motor hub is formed with a step for accepting said clamp.

16. Apparatus as in claim 14, including a three-finger disk clamp chuck housed in said torque gage for securing said disk clamp and said screw in a fixed position in said torque gage.

17. Apparatus as in claim 14, including a driver for fastening said clamp to said motor hub with said screw.

18. Apparatus as in claim 17, wherein said driver comprises a shaft, and a slip joint for allowing said shaft to float bidirectionally while said driver is rotated.

19. Apparatus as in claim 17, including a rotatable torque gauge knob for rotating said driver and said screw to tighten said clamp to said hub.

20. Apparatus as in claim 1, comprising load fingers, and a control knob for opening and closing said fingers relative to said head flexures.

* * * * *